United States Patent

Veret et al.

[11] Patent Number: 5,944,047
[45] Date of Patent: Aug. 31, 1999

[54] ELECTROVALVE INSTALLATION EQUIPPED WITH A DEVICE FOR ATTACHMENT TO A SUPPORT, AND HYDRAULIC BLOCK EQUIPPED WITH SUCH AN INSTALLATION

[75] Inventors: Dominique Veret, Suresnes; Alain Tranzer, Chatenay-Malabry, both of France

[73] Assignees: Automobiles Peugeot, Paris, France; Automobiles Citroen, Neuilly Sur Seine, France

[21] Appl. No.: 08/951,100

[22] Filed: Oct. 15, 1997

[30] Foreign Application Priority Data

Oct. 15, 1996 [FR] France ................................. 96.12570

[51] Int. Cl.$^6$ ................................................. F16K 31/06
[52] U.S. Cl. ........................... 137/454.6; 251/129.14; 251/129.15
[58] Field of Search ................. 251/129.15, 129.14; 137/884, 560, 454.2, 454.6

[56] References Cited

U.S. PATENT DOCUMENTS

| | | |
|---|---|---|
| 3,965,923 | 6/1976 | Allen . |
| 4,054,854 | 10/1977 | Marsden . |
| 4,478,241 | 10/1984 | Cardenas-Franco et al. .......... 137/884 |
| 4,736,965 | 4/1988 | Smith . |
| 5,040,853 | 8/1991 | Burgdorf et al. ....................... 303/119 |
| 5,127,440 | 7/1992 | Maas et al. ............................. 137/884 |
| 5,199,456 | 4/1993 | Love et al. ........................... 251/129.15 |
| 5,333,946 | 8/1994 | Goossens et al. ............. 251/129.15 X |
| 5,364,067 | 11/1994 | Linkner, Jr. ........................... 137/454.2 |
| 5,449,227 | 9/1995 | Steinberg et al. ................. 251/129.15 |
| 5,460,350 | 10/1995 | Nagashima et al. .............. 251/129.15 |
| 5,462,344 | 10/1995 | Jakob et al. ............................. 137/884 |
| 5,476,313 | 12/1995 | Lauer ................................. 251/129.15 |
| 5,577,322 | 11/1996 | Ohshita et al. ................. 251/129.15 X |
| 5,601,275 | 2/1997 | Hironaka ............................. 251/129.15 |
| 5,626,326 | 5/1997 | Goossens et al. ................. 251/129.15 |
| 5,653,249 | 8/1997 | Reinartz et al. ............... 251/129.15 X |
| 5,681,099 | 10/1997 | Steffes et al. ........................... 137/884 |
| 5,704,587 | 1/1998 | Kurimitsu et al. ................. 251/129.15 |
| 5,722,633 | 3/1998 | Goossens et al. ................. 251/129.15 |

FOREIGN PATENT DOCUMENTS

| | | |
|---|---|---|
| 40 30 571 A1 | 4/1992 | Germany . |
| 41 33 641 A1 | 4/1992 | Germany . |
| 40 05 094 A1 | 9/1992 | Germany . |

OTHER PUBLICATIONS

Patent Abstracts of Japan, vol. 097, No. 001, Jan. 31, 1997, and JP 08 247324 A (Abstract only, in English).

*Primary Examiner*—John Rivell
*Assistant Examiner*—Meredith H. Schoenfeld

[57] ABSTRACT

An electrovalve installation of the type comprising an electrovalve and a device for fastening said electrovalve to a support, such as a hydraulic block. The installation includes a collar (2) for detachably mounting the electrovalve (1) on the support (3).

10 Claims, 2 Drawing Sheets

ELECTROVALVE INSTALLATION EQUIPPED WITH A DEVICE FOR ATTACHMENT TO A SUPPORT, AND HYDRAULIC BLOCK EQUIPPED WITH SUCH AN INSTALLATION

FIELD OF THE INVENTION

The invention concerns an electrovalve installation, of the type comprising an electrovalve and a device for securing this electrovalve to a support, such as a hydraulic block, as well as a hydraulic block equipped with an installation of this kind.

BACKGROUND OF THE INVENTION

The current state of the art encompasses electrovalve installations in which the electrovalve is mounted on its support by crimping and fastening, as is the case, for example, in automotive braking systems.

The problem associated with these conventional installations lies in the fact that, if damage occurs, it is impossible to replace the electrovalve alone, but that the entire block must be replaced, thereby entailing a relatively sizable expense.

SUMMARY OF THE INVENTION

The invention is intended to solve this problem by proposing an electrovalve installation allowing detachable mounting of the electrovalve.

To this end, the electrovalve installation according to the invention is characterized by the fact that it incorporates means designed for the detachable mounting of the electrovalve on the support.

According to one invention feature, the detachable mounting means comprise a collar or flange removably attached to the support, incorporating a shaped portion which cooperates with a shaped portion of the electrovalve having a matching shape, and is configured so as to hold the electrovalve in its mounted position for as long as the collar remains fastened to the support.

BRIEF DESCRIPTION OF THE DRAWINGS

The invention will be better understood and other ends, features, details and advantages thereof will emerge with greater clarity in the following explanatory description, which is offered with reference to the attached schematic drawings provided solely as an example illustrating one embodiment of the invention, and in which.

DESCRIPTION OF THE PREFERRED EMBODIMENT

Figure 1:
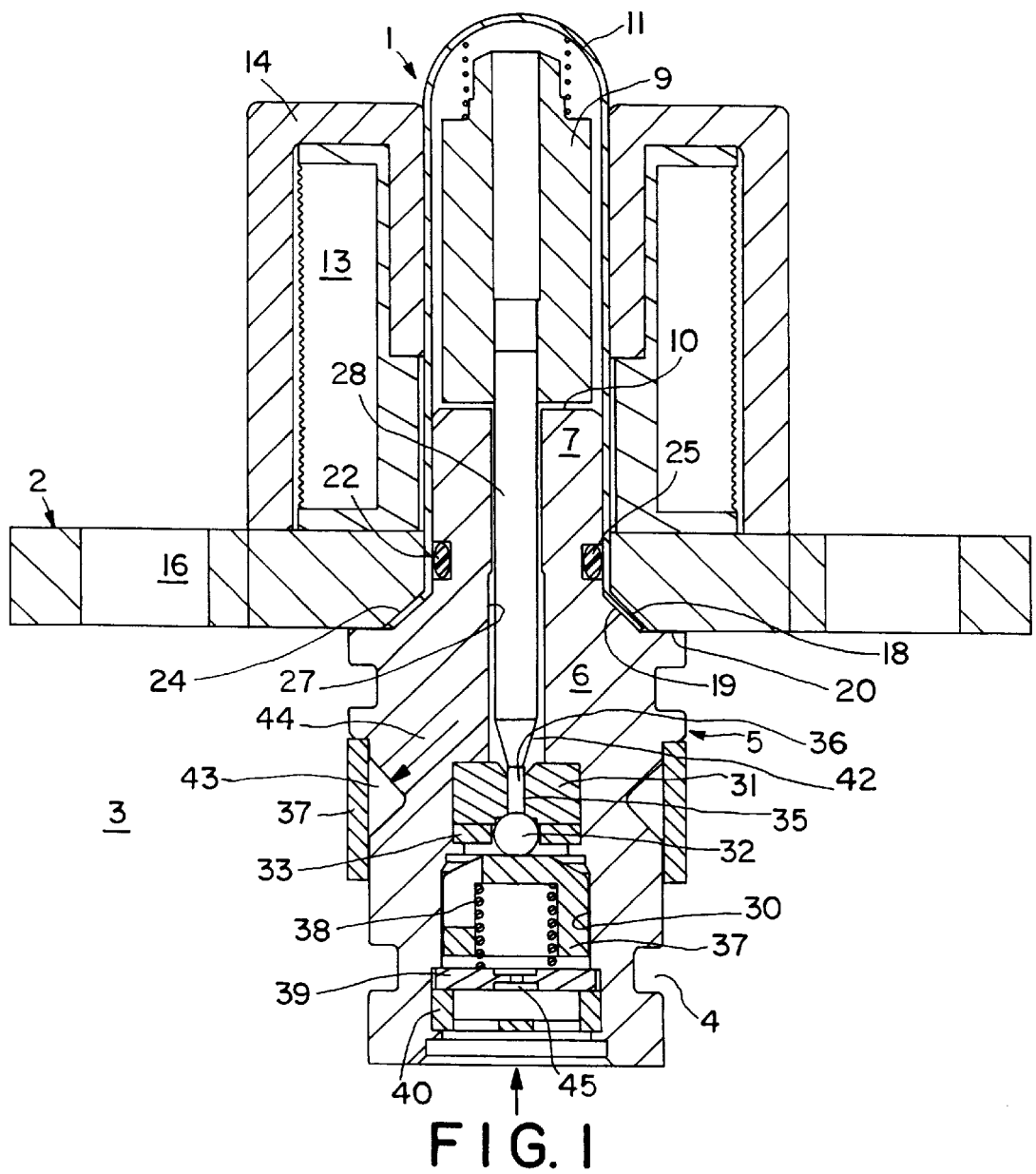
FIG. 1 is a cross-section of an electrovalve installation according to the invention, shown along the axis of the electrovalve.

As shown in FIG. 1, an electrovalve installation according to the invention comprises basically an electrovalve 1 and a collar 2 used to attach the electrovalve to a support 3, such as a hydraulic block incorporating a recess 4 in which the body 5 of the electrovalve is housed and whose shape, accordingly, matches the shape of this body. When the collar 2 is attached to the support, the electrovalve is held in place on the support by means of cooperating shaped portions of the collar and the electrovalve, as will be described hereinbelow.

The electrovalve comprises the aforementioned body 5 composed of two cylindrical sections, i.e., a lower section 6 which engages in the recess 4 in the support 3, and an upper section 7 of lesser diameter, a core 9 mounted so as to be able to travel along the axis of the upper section 7, with interposition of an air gap block 10, a tube 11 made of a non-magnetic material surrounding the core and the section 7, as well as a unit composed of a coil 13 and a polar mass 14, which surrounds the tube 11 coaxially. When assembled, this unit rests on the upper surface of the collar 2. This collar is fastened to the support 3, for example using screws (not shown), which are designed to fit through openings 16 made in the collar 2.

The cylindrical tube 11 incorporates at its lower end a flared, conical portion 18 supported on an area 19 whose shape matches that of the body 6, which is located between a radial shouldering surface 20 belonging to the section 6, and the smaller-diameter section 7 of the body 5. As shown clearly in the figure, the opening 22 allowing the collar 2 to be mounted so as to slide on the tube 11 is also flared, i.e., at 24, in the area of the lower face of the collar resting on the support 3, in a configuration which corresponds to the outer face of the flared portion 18 of the tube 11, in such a way that this flared portion 18 of the tube is held between the flared portion 24 of the collar and the inclined area 19 of the body 6 when the collar is fastened to the block 3.

Fluid-tightness under pressure of the electrovalve mounted in this way on the body 3 and locked in this position by means of the collar 2 is ensured by using an O-ring seal 25 inserted in an annual groove made in an area of the section 7 located inside the orifice 22 allowing penetration of the collar 2. This seal is held in place by the clamping action exerted by the tube, which is, in turn, held in place by the collar.

The body 5 has running through it axially an orifice comprising an upper portion 27, which allows travel of a thrustor 28 integral with the core, and a lower portion 30 of greater diameter contained in the section 6 of the body 5 constituting a recess 30 is open at the free end of the section 6 of the body 5. The bottom thereof houses a valve mechanism comprising a seat 31 and a ball 32 guided in a washer 33. The seat 31 has drilled through it an orifice 35, through which the smaller-diameter, lower end of the thrustor 28 travels, the latter being designed to raise the ball 32 from the seat thereof when the core 9 travels until making contact on the air gap block 10. The recess 30 further houses a thrustor 37 designed to push the ball 32 back on the seat thereof when acted upon by a spring 38 secured to a plate 39 held in position by a filter 40, which is itself set in the end of the recess 30.

It can be noted, moreover, that, above the seat 31, the upper portion 27 of the drill hole through which the thrustor 28 travels incorporates an annular space 42 which connects, through an inclined duct 44, with a groove 43 in the peripheral face of the section 6 of the body 5. The groove is covered by a filter 67 comprising an orifice (not shown) which constitutes the electrovalve-outlet orifice, the inlet being formed by the recess 30 in the section 6, as symbolized by an arrow. The orifice 45 in the plate 39 allows flow control as a function of fluid pressure.

As regards electrovalve operation, it can merely be indicated that, when excited by an electric current, the electrovalve generates a magnetic field across the polar mass 14, the collar 2, the body 6, the core 9, and the non-magnetic guide tube 11, so as to generate a force on the core 9. This force causes the core to travel toward the body 6 until the core is positioned on the air gap block 10. When acted upon by the travel of the core 9, the thrustor 28 raises the ball 32 from the seat thereof, so that pressurized fluid can flow through the body 6 in order to reach the outlet groove 43.

When electric power is cut off, the thrustor 37 returns the ball 32 to the seat thereof, in order to provide fluid-tightness between the inlet and outlet of the electrovalve.

Figure 2:
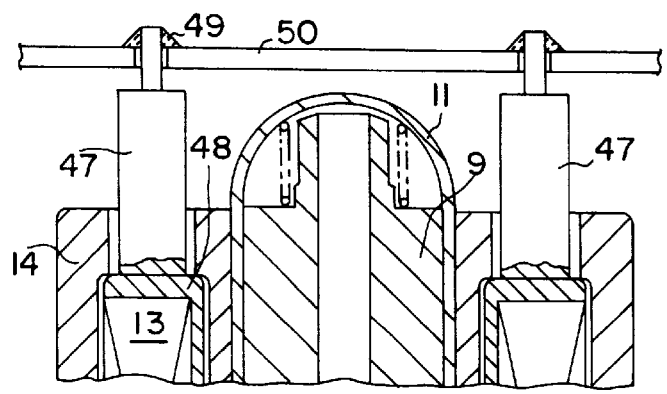
FIG. 2 is a view similar to that in FIG. 1 and partially torn away, showing a computer mounted on the electrovalve.

The electrovalve may receive electric power from a computer, such as that mounted on the electrovalve and illustrated in FIG. 2. It can be seen that, using intermediate elements 47 made integral with the coil mount shown at reference 48, the coil 13 is soldered at 49 to the wall of the computer 50. In this way, the coil 13/polar piece 14 assembly, with the computer, can be removed by sliding it along the tube 11.

The main advantage of the structure just described lies in the two methods for disassembling the electrovalve. First, after removing the collar 2, the subassembly, called the hydraulic cartridge, which comprises the body 5 and the components thereof as well as the tube 11 holding the core 9 contained within it, can be removed without causing any damage to the support. It is also possible to disassemble the tube 11 from the body without damaging the internal components, thereby minimizing the cost of replacing defective parts. Consequently, the invention allows replacement of the hydraulic cartridge without causing any damage to the support and simple replacement of the internal electrovalve components. Accordingly, the invention can minimize costs during the development phase, the production start-up phase, and during the after-sale period.

Figure 3:
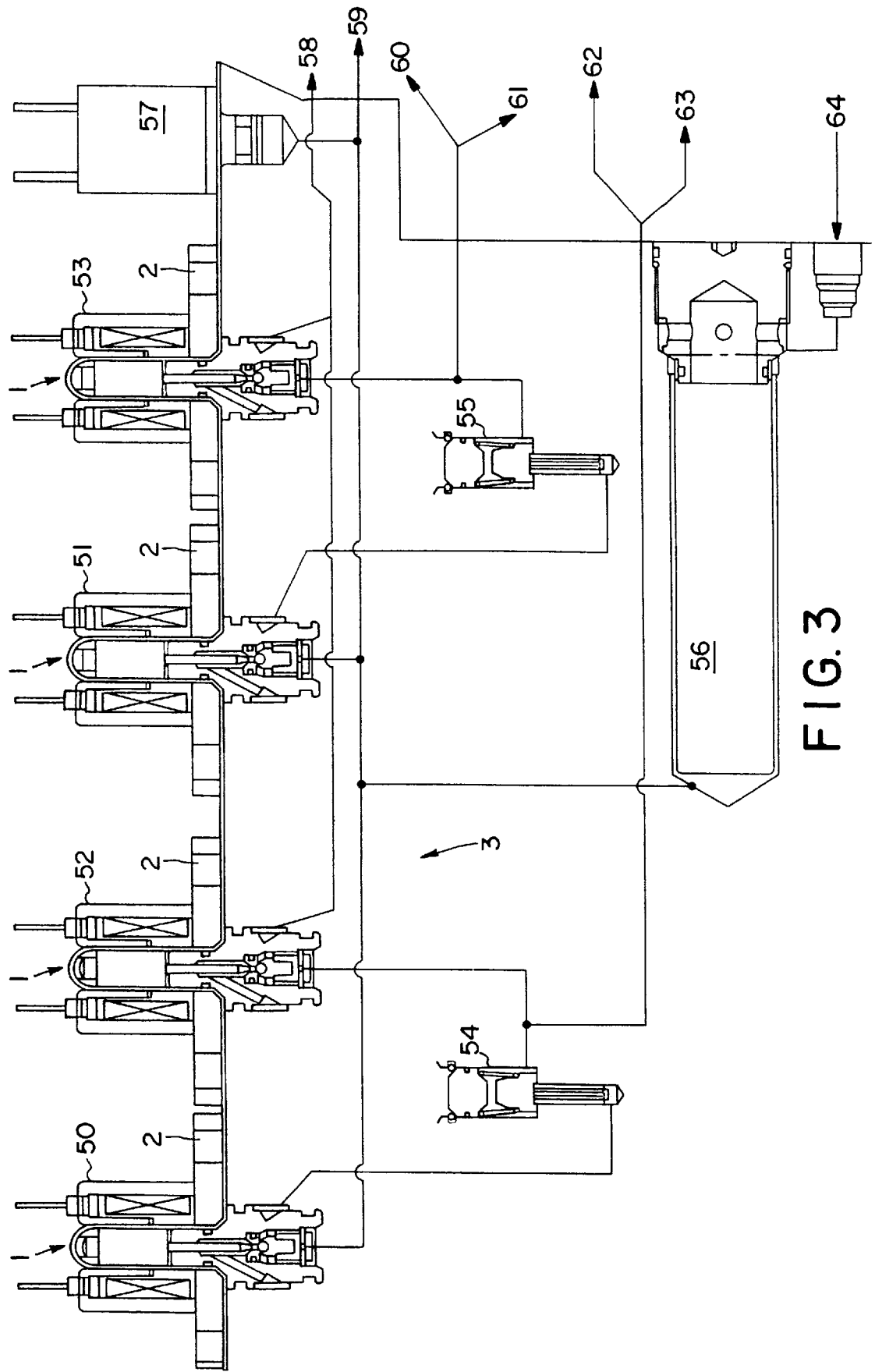
FIG. 3 is a schematic view of a hydraulic block used for an automotive hydropneumatic suspension, illustrating several electrovalve installations according to the invention.

The advantages deriving from the invention clearly emerge in FIG. 3, which illustrates the implementation of the invention in a system controlling an automotive hydropneumatic suspension, such as that described in French Patent Application No. 96 08 351 of Jul. 4, 1996 in the Applicants' names. The description of this system is incorporated by reference into the description of the invention in question.

As described in the aforementioned document, the control system comprises a hydraulic block which forms the support block 3 in FIG. 1, on which are mounted, using collars 2, four electrovalves identical to the electrovalve 1, i.e., the front and rear intake electrovalves 50 and 51 and the two front and rear exhaust electrovalves 52 and 53, respectively. Reference numbers 54 and 55 designate front and rear non-return valves. The valve 54 is mounted between the outlet of the front intake valve 50 and the front escape electrovalve 52, while the valve 55 is positioned between the outlet of the rear intake electrovalve 51 and the rear escape electrovalve 53. Moreover, the figure shows a high-pressure filter 56 and a pressure controller 57. Reference numbers 58 to 64 designate, respectively, a tank return line, a high-pressure outlet, a rear suspension drain plug outlet, an outlet leading to the rear suspension, a front suspension drain plug outlet, an outlet leading to the front suspension, and a switch feed.

It can be seen that the lines connecting the various inlets and outlets mentioned above, along which the electrovalves arc positioned, are formed by ducts produced within the block.

Given the number of electrovalves mounted on the hydraulic block, the ability to remove the electrovalves, in particular in order to replace the hydraulic cartridges thereof without causing any damage to this hydraulic supply block, clearly highlights the special nature of the invention and the aforementioned advantages it offers.

What is claimed is:

1. An electrovalve installation, of the type comprising an electrovalve and a device for securing the latter to a support, wherein said installation comprises means for detachably mounting the electrovalve on the support, said detachable mounting means comprising a collar which can be detachably fastened to the support and which incorporates a shaped portion cooperating with a shaped portion whose form corresponds to the shape of the electrovalve and which is configured to hold the latter in its mounted position for as long as the collar is fastened to the support, the electrovalve being of the type comprising a first section incorporating movable equipment and a hydraulic cartridge, and a second section incorporating a coil, wherein the electrovalve comprises a tube made of a non-magnetic material surrounding said cartridge at least partially, one portion of which is inserted in an orifice in the collar, wherein the inserted portion comprises a portion which is engaged behind the lower surface of the collar, which abuts the support, and wherein the open insertion end of the aforementioned cartridge of the tube is flared and rests on a flared region of the collar, which enlarges in corresponding fashion as it extends toward a lower face abutting the support.

2. The electrovalve installation according to claim 1, wherein said support is a hydraulic block.

3. The electrovalve installation according to claim 1, wherein the collar is fastened to the support using removable means.

4. The electrovalve installation according to claim 3, wherein the removable means are attachment screws.

5. The electrovalve installation according to claim 1 wherein the flared end of the tube and the flared portion of the collar incorporate matching conical profiles.

6. The electrovalve installation according to claim 1, wherein the collar is mounted so as to slide on the tube.

7. The electrovalve installation according to claim 1, wherein said second section comprising the coil is mounted coaxially on the tube and rests on the upper surface of the collar when the electrovalve is assembled in position.

8. The electrovalve installation according to claim 1, designed for an electrovalve comprising a control device, wherein the electrovalve is made at least partially integral with a computer.

9. The electrovalve installation according to claim 8, wherein the computer is mounted on the coil of the electrovalve.

10. A hydraulic block, intended in particular for a system controlling, an automotive hydropneumatic suspension and fitted with a pressurized fluid source, a return tank, a multiplicity of internal ducts, and at least one electrovalve designed to establish lines of fluid flow within the block between the suspension, said source, and said tank by means of said multiplicity of internal ducts, wherein said hydraulic block comprises at least one electrovalve installation according to claim 1, the hydraulic block constituting the aforementioned support.

* * * * *